United States Patent [19]

Stefanik et al.

[11] Patent Number: 4,903,144
[45] Date of Patent: Feb. 20, 1990

[54] AUTOMATIC D.C. OFFSET CONTROL FOR IMAGE SCANNERS

[75] Inventors: Mark E. Stefanik; Martin Potucek, both of Rochester, N.Y.

[73] Assignee: Eastman Kodak Company, Rochester, N.Y.

[21] Appl. No.: 263,462

[22] Filed: Oct. 27, 1988

[51] Int. Cl.$^4$ .............................................. H04N 1/40
[52] U.S. Cl. .................................. 358/461; 358/464
[58] Field of Search ............... 358/443, 446, 461, 464, 358/163, 171

[56] References Cited

U.S. PATENT DOCUMENTS

| | | | |
|---|---|---|---|
| 3,379,826 | 4/1968 | Gray | 358/464 |
| 3,985,954 | 10/1976 | Kuniyoshi et al. | 358/171 |
| 4,216,503 | 8/1980 | Wiggins | 358/446 |
| 4,329,717 | 5/1982 | Logie et al. | 358/446 |
| 4,408,231 | 10/1983 | Bushaw et al. | 358/446 |
| 4,654,723 | 3/1987 | Nagano | 358/483 |
| 4,660,082 | 4/1987 | Tomohisa et al. | 358/461 |
| 4,694,353 | 9/1987 | Sato | 358/455 |
| 4,806,780 | 2/1989 | Yamamoto et al. | 358/461 |
| 4,807,045 | 2/1989 | Shimano | 358/461 |

*Primary Examiner*—Howard W. Britton
*Assistant Examiner*—Tommy D. Lee
*Attorney, Agent, or Firm*—Milton S. Sales

[57] ABSTRACT

A system for calibration and closed loop feedback control of image signals from charge coupled imaging devices (CCDs). During periodic calibration, sampling the output of dark reference cells on a CCD nets an initial D.C. restoration voltage (black) level. Next, a black reference strip is scanned and, an offset value is determined and an offset voltage is added to the D.C. restoration (black) level. During each scan line of regular scanning, dark cells are sampled and produce a voltage that is modified by the offset voltage that was determined during calibration.

24 Claims, 2 Drawing Sheets

AUTOMATIC D.C. OFFSET CONTROL FOR IMAGE SCANNERS

TECHNICAL FIELD

This invention relates to the restoration of image signals from a photosensitive scanning array to provide an absolute output signal level. More particularly, the invention relates to calibration of D.C. restoration level signals that provide automatic offset control of the signals from the array.

BACKGROUND ART

Machines designed for printing document reproductions require a means for scanning an original document. Systems for scanning and reproducing image information employ devices such as charge coupled devices (CCDs). Analog output signals produced by CCDs contain (1) a D.C. offset component that is attributable to the inherent operating characteristics of the CCD and (2) a video component that is attributable to the exposure of the CCD to light.

It is necessary to remove the unwanted D.C. component. One technique for restoring a signal to an absolute value is taught by U.S. Pat. No. 4,216,503 which issued on Aug. 5, 1980 to D. G. Wiggins. An average of scanned values from the output of dark cells on the CCD is used to calculate offset voltage to be subtracted from the CCD output signal, for the subsequent scan.

While the signal restoration technique of the Wiggins patent isolates the dark level signals, the technique is not optimum. The use of the output of dark cells to calculate an offset voltage to be subtracted from the CCD output reduces the dynamic range of operation of the overall systems. Because of characteristics of human perception, of inks, dyes, and toners used in printing, and of CCDs, printed black is not the same as absolute black (the absence of all light. For example, an eight-bit system has 256 discrete gray levels of possible operation. A system that bases offset control solely on the output of dark cells will have a dynamic range of operation of less than 256 gray levels; say 243 gray levels, or 13 levels less than the same system with optimum offset control.

DISCLOSURE OF THE INVENTION

An object of the present invention is to provide an automatic offset control system which adjusts the signals from an image scanning device by removing the effective offset voltage while maintaining substantially the full dynamic range of operation of the overall system.

Generally, the present invention provides apparatus and procedure to restore the output signal to a known D.C. level, from which the video component is referenced. D.C. restoration is accomplished in two steps. During each scan line, dark reference cells on the CCD are sampled and the voltage from the sampling is subtracted from the CCD signal. To provide a "fine tuning" of the D.C. restoration function, a reference strip of known reflectivity is provided along a crosstrack edge of the platen surface. During a periodic calibration, there is a process where the reference strip is scanned and the measured output from the scan is compared to a reference value that represents the expected value corresponding to the reflectivity of the reference strip. From comparison of the measured and expected values, an offset voltage is generated and added to the CCD output signal.

In a preferred embodiment of the present invention, a scanner having a photosensitive scanning array for producing a series of analog image signals containing a video component and a D.C. offset component which is characteristic of the scanning array includes restoring the image signal to a known D.C. level from which the video component is referenced. The improvement comprises periodically scanning a substantially black reference region to produce a scanned value signal, comparing the scanned value signal to a predetermined value to produce an offset value signal, periodically producing a signal characteristic of the D.C. offset component of the scanning array, producing an offset voltage signal from the D.C. offset component signal and the offset value signal, and modifying the image signals in response to the offset voltage signal.

Preferably, the photosensitive scanning array is an array of charge coupled devices having dark reference cells, and the means for producing the D.C. offset component signal samples the dark reference cells on the scanning array. The preferred signal restoring means further includes means for averaging a plurality of signals from different regions of the reference region wherein the scanned value signal is the average of a plurality of signals from different regions of the reference region. The scanning array scans a document line by line, and the D.C. offset component of the scanning array is produced each scan line. A platen may be provided for original documents to be scanned, and the reference region may be located along a crosstrack edge of the platen.

BRIEF DESCRIPTION OF THE DRAWINGS

The subsequent description of the preferred embodiments of the present invention refers to the attached drawings, wherein.

BEST MODE FOR CARRYING OUT THE INVENTION

Figure 1:
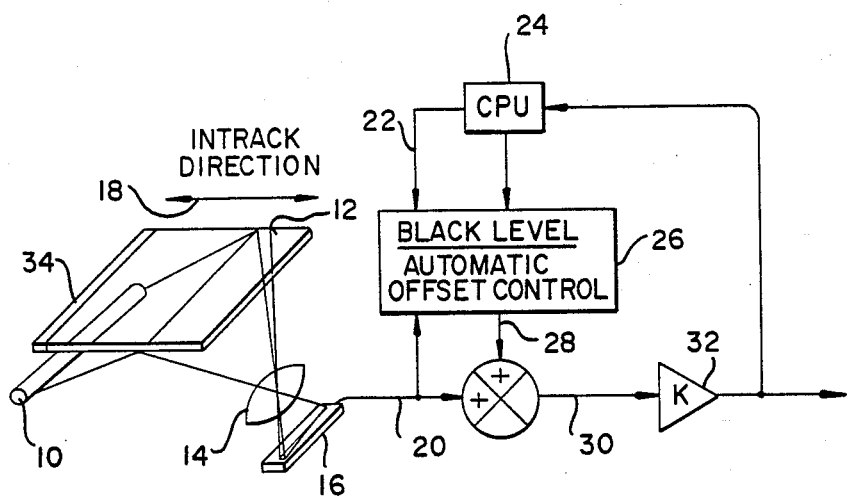
FIG. 1 is a schematic of a preferred embodiment of the present invention.

In the scanner of FIG. 1, a light source 10 illuminates an original document on top of a platen surface 12. Light is reflected from the original document, through a lensing means 14 onto a photosensitive scanning array, such as a charge coupled device (CCD) 16, to convert the image of the original document to a series of electronic image signals. The document is scanned in the intrack direction 18 to cause reflected light from different areas of the original to become focused on the CCD, which outputs on a line 20 to a summing circuit. The image signals on line 20 comprise a video component of a D.C. offset component which is characteristic of the scanning array.

During each scan line of regular scanning, dark cells are sampled and produce a voltage that is modified by the offset voltage that was determined during calibration to maintain the proper black level of the signal.

During periodic calibration, an enable strobe signal 22 from a CPU 24 causes an automatic offset control 26 to sample the output from conventional dark reference cells of the CCD and store the average value. As will be explained, the average dark cell signal will subsequently be used in determining an offset voltage signal 28 to be summed with the image signals on line 20 for D.C. restoration to make a modified image signal 30. Signal 30 is then input to an analog to digital amplifier 32.

After the outputs from the dark reference cells are stored, a reference strip 34, having a known reflectivity, is scanned. The scanned values of reference strip 34 are amplified and fed back to CPU 24, which compares the value to a predetermined value stored in the memory of CPU 24. An offset value signal is determined by CPU 28 and sent over a line 22 to automatic offset control 26 for generation of a "fine tuning" offset voltage signal that is to be added to the image signals. Reference strip 34 is preferably high density, such as substantially black.

Figure 2:
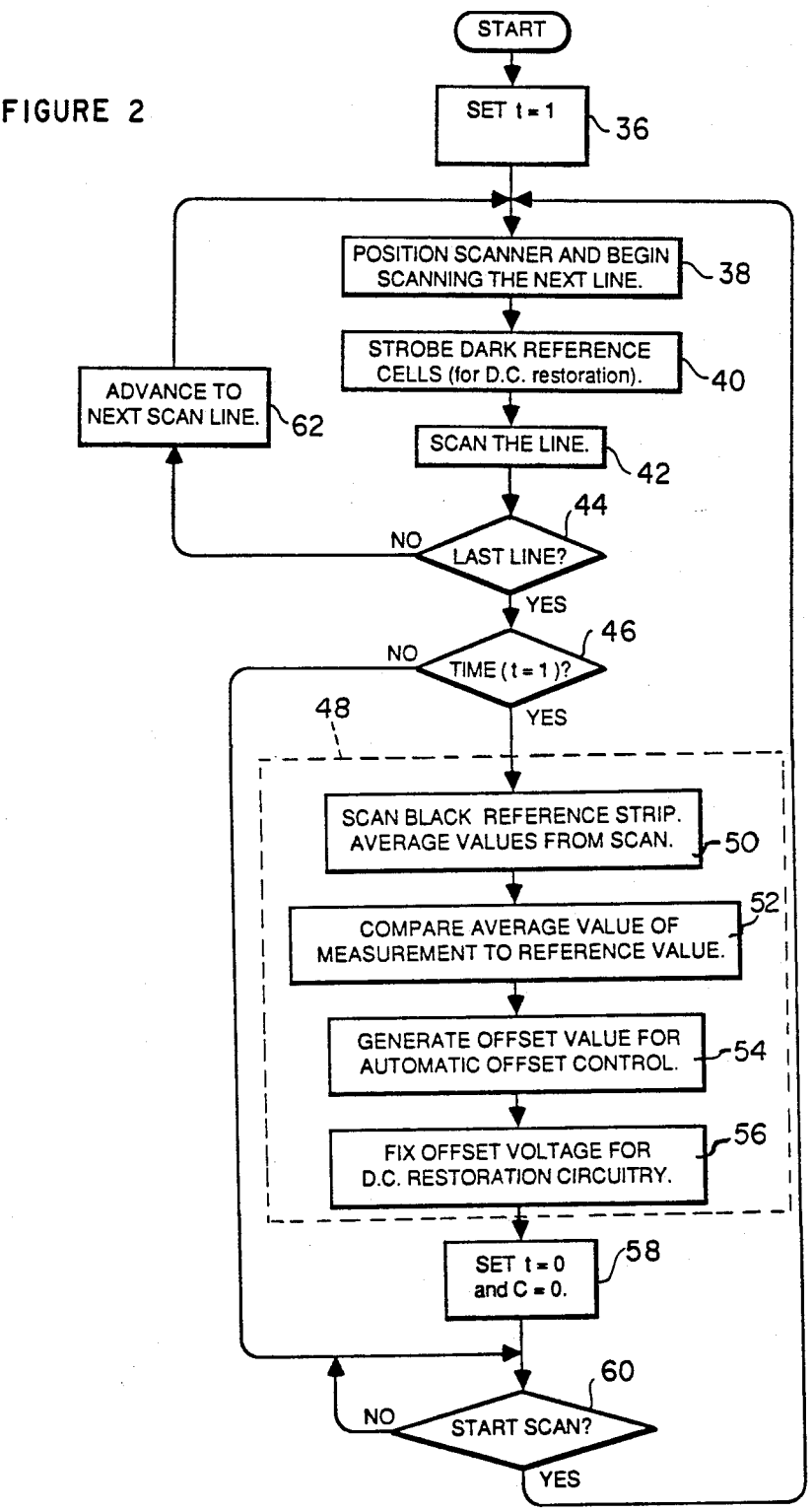
FIG. 2 is a logic flow chart for the control system of FIG. 1.

FIG. 2 is a flow chart that defines the overall system concept of the invention. From start, in block 36 a variable "t", that indicates when it is time to do the calibration procedure, is initialized to 1, indicating that it is time to calibrate the overall system. As the algorithm moves to block 38, the scanner is positioned and begins scanning the next line, which in the initial case is the first line of the calibration procedure. During block 40 of the algorithm, the CPU samples the output from dark reference cells of the CCD. From the sampled outputs, the voltage is generated that is used as an initial D.C. restoration level signal that is subtracted, by hardware, from CCD output signal 20. The algorithm moves to block 42, wherein the scan of the current line is completed.

Since it is not desirable to interrupt the scanning of a job that is in process, the algorithm moves to decisional block 44 wherein it is determined if it is a suitable time to entertain a calibration request. In the case of calibration scans, each scan line would be considered a last line. Decisional block 46 provides the algorithm with the ability to provide the calibration process as the result of a request that is external to the algorithm. The variable "t" could be changed at regular intervals or as the result of hardware or software events, which would allow periodic, automatic calibration of the system.

General block 48 is where the automatic offset control performs its function to fine tune the D.C. restoration of the CCD output signal. Within block 48, algorithm moves into block 50 wherein black reference strip 34 (FIG. 1) is scanned. At block 52 the scanned values are compared to a reference value and during block 54 the CPU determines an offset value from the comparison. The algorithm moves into block 56 where at the offset value is converted to an offset voltage that will be used to "fine tune" the D.C. restoration level.

Upon successful negotiation of block 48 the periodic, fine tuning calibration of the D.C. restoration level signal is completed. Functional block 58 is for initialization of the variables used in calibration such that t=0 meaning it is not time to calibrate.

The algorithm moves into and remains at a decisional block 60 while awaiting a command to start normal scanning. When the command to start scan is received, the algorithm moves to block 38 for positioning, block 40 for dark cell readings, block 42 for scanning, and into decisional block 44. If there are more lines to scan, the algorithm moves to a block 62 for advancing the scan line and on to begin the normal scan sequence blocks 38, 40, 42, 44, and 62 until the last scan line is completed.

Upon completion of the last scan line, the algorithm will move from decisional block 44 into decisional block 46 wherein the algorithm checks to see if it is time to do a calibration. This block is intended to add the capacity to do periodic calibrations of the scanner. Since this algorithm has set t=0, requests such as interrupts, polling, or hardware outputs that are external to the algorithm can affect the value of "t". Obviously "t" could be maintained within the algorithm, which would cause "t" to be dependent upon number of scans, or other means could be provided that would allow this capacity for periodic calibration.

Figure 3:
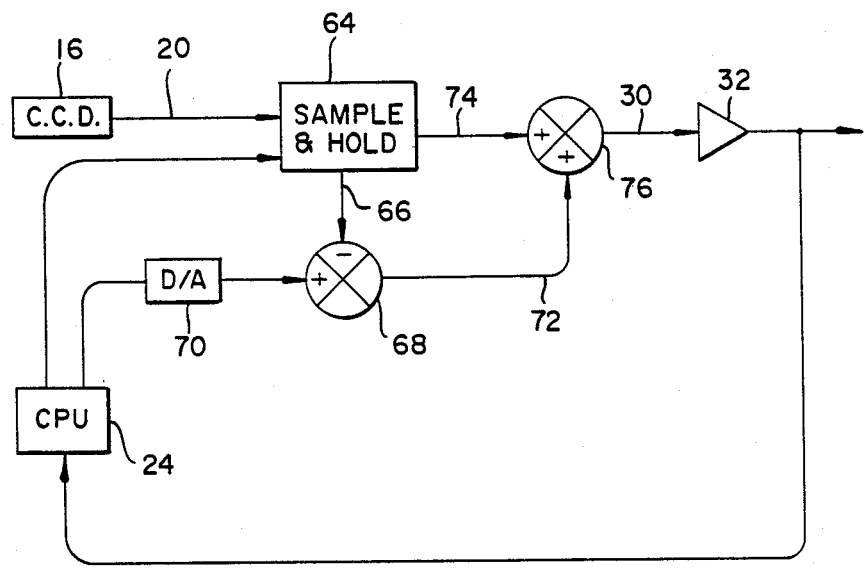
FIG. 3 is a more detailed block diagram of the automatic offset control system.

FIG. 3 is a block diagram of the preferred embodiment of the automatic offset control system. Image signal 20 is input to a sample and hold circuit 64 which samples the dark reference cells on CCD 16. Sampled voltage 66 is subtracted at 68 from the offset value signal of a digital to analog converter 70 to form offset voltage signal 72. Offset voltage 72 is summed with the unsampled CCD output signal 74, by a summing circuitry 76, to produce D.C. restored modified image signal 30.

The invention has been described in detail with particular reference to preferred embodiments thereof, but it will be understood that variations and modifications can be effected within the spirit and scope of the invention.

What is claimed is:

1. In a scanner having a photosensitive scanning array for producing a series of analog image signals containing a video component which is characteristic of a scanned image and a D.C. offset component which is characteristic of the scanning array; improved means for restoring the image signal to a known D.C. level from which the video component is referenced, said improved means comprising:
    means for periodically scanning a reference region of known reflectivity to produce a scanned value signal;
    means for comparing said scanned value signal to a predetermined value to produce an offset value signal;
    means for periodically producing a signal characteristic of the D.C. offset component of the scanning array;
    means for producing an offset voltage signal from the D.C. offset component signal and said offset value signal; and
    means responsive to said offset voltage signal for modifing the image signals.

2. The improved signal restoring means of claim 1 wherein
    the photosensitive scanning array is an array of charge coupled devices having dark reference cells; and
    said means for producing said D.C. offset component signal samples the dark reference cells on the scanning array.

3. The improved signal restoring means of claim 1 further comprising means for averaging a plurality of signals from different positions on the reference region, wherein said scanned value signal is the average of a plurality of signals from different positions of the reference region.

4. The improved signal restoring means of claim 1 wherein
    said scanning array scans a document line by line, and said D.C. offset component of the scanning array is produced each scan line.

5. The improved signal restoring means of claim 1 wherein said predetermined value is that value that represents the expected value corresponding to the known reflectivity of the reference region.

6. The improved signal restored means of claim 1 wherein the reference region is substantially black.

7. The improved signal restoring means of claim 1 further comprising a platen for original documents to be scanned, wherein said reference region is located along one edge of the platen.

8. The improved signal restoring means of claim 5 wherein said reference region is along a crosstrack edge of the platen.

9. In a scanner having a photosensitive scanning array for producing a series of analog image signals containing a video component which is characteristic of a scanned image and a D.C. offset component which is characteristic of the scanning array; improved means for restoring the image signal to a known D.C. level from which the video component is referenced, said improved means comprising:
    means for periodically scanning a substantially black reference region to produce a scanned value signal;
    means for comparing said scanned value signal to a predetermined value to produce an offset value signal;
    means for producing a signal characteristic of the D.C. offset component of the scanning array;
    means for subtracting the D.C. offset component signal from said offset value signal to produce an offset voltage signal; and
    means for adding the offset voltage signal to the image signals to modify the image signals.

10. The improved signal restoring means of claim 9 wherein
    the photosensitive scanning array is an array of charge coupled devices having dark reference cells; and
    said means for producing said D.C. offset component signal samples the dark reference cells on the scanning array.

11. The improved signal restoring means of claim 9 further comprising means for averaging a plurality of signals from different positions on the reference region wherein said scanned value signal is the average of a plurality of signals from different positions of the reference region.

12. The improved signal restoring means of claim 9 wherein
    said scanning array scans a document line by line, and
    said D.C. offset component of the scanning array is produced each scan line.

13. The improved signal restoring means of claim 9 wherein said predetermined value is that value that represents the expected value corresponding to the reflectivity of the reference region.

14. The improved signal restoring means of claim 9 wherein the reference region is substantially black.

15. The improved signal restoring means of claim 9 further comprising a platen for original documents to be scanned, wherein said reference region is located along one edge of the platen.

16. The improved signal restoring means of claim 15 wherein said reference region is along a crosstrack edge of the platen.

17. A process for restoring a series of scanned image signals containing a video component and a D.C. offset component to a known D.C. level from which the video component is referenced, said process comprising the steps of:
    periodically scanning reference region of known reflectivity to produce a scanned value signal;
    comparing said scanned value signal to a predetermined value to produce an offset value signal;
    periodically producing a signal characteristic of the D.C. offset component of the scanning array;
    producing an offset voltage signal from the D.C. offset component signal and said offset value signal; and
    for modifing the image signals in response to said offset voltage signal.

18. The process of claim 17 further comprising the step of averaging a plurality of signals from different positions on the reference region wherein said scanned value signal is the average of a plurality of signals from different positions of the reference region.

19. The process of claim 17 wherein said D.C. offset component is produced each scan line.

20. The process of claim 17 wherein said predetermined value is that value that represents the expected value corresponding to the reflectivity of the reference region.

21. A process for restoring a series of scanned image signals containing a video component and a D.C. offset component to a known D.C. level from which the video component is referenced, said process comprising the steps of:
    periodically scanning a reference region of known reflectivity to produce a scanned value signal;
    comparing said scanned value signal to a predetermined value to produce an offset value signal;
    producing a signal characteristic of the D.C. offset component of the scanning array;
    subtracting the D.C. offset component signal from said offset value signal to produce an offset voltage signal; and
    adding the offset voltage signal to the image signals to modify the image signals.

22. The process of claim 21 further comprising the step of averaging a plurality of signals from different positions on the reference region wherein said scanned value signal is the averge of a plurality of signals from different positions of the reference region.

23. The process of claim 21 wherein said D.C. offset component is produced each scan line.

24. The process of claim 21 wherein said predetermined value is that value that represents the expected value corresponding to the reflectivity of the reference region.

* * * * *